United States Patent [19]

Wessling

[11] Patent Number: 5,721,056
[45] Date of Patent: Feb. 24, 1998

[54] PROCESS FOR THE PRODUCTION OF CORROSION-PROTECTED METALLIC MATERIALS AND MATERIALS OBTAINABLE THEREWITH

[75] Inventor: Bernhard Wessling, Bargteheide, Germany

[73] Assignee: Zipperling Kessler & Co. (GmbH & Co.), Ahrensburg, Germany

[21] Appl. No.: 392,861

[22] PCT Filed: Jun. 21, 1994

[86] PCT No.: PCT/EP94/02023

§ 371 Date: Feb. 27, 1995

§ 102(e) Date: Feb. 27, 1995

[87] PCT Pub. No.: WO95/00678

PCT Pub. Date: Jan. 5, 1995

[51] Int. Cl.$^6$ ................................. B05D 3/04; B32B 15/08
[52] U.S. Cl. .................................. 428/461; 427/333
[58] Field of Search .......................... 427/333, 336, 427/388, 409; 428/461, 457

[56] References Cited

U.S. PATENT DOCUMENTS

| | | | |
|---|---|---|---|
| 5,248,526 | 9/1993 | Ogawa | 427/333 |
| 5,270,417 | 12/1993 | Soga | 427/333 |

FOREIGN PATENT DOCUMENTS

WO93/14166  7/1993  WIPO.

OTHER PUBLICATIONS

DeBerry, J. Electro Chemical Society 16 Bd 132, 14 1985 pp. 1022–1026.

*Primary Examiner*—Scott Kastler
*Attorney, Agent, or Firm*—Cushman Darby & Cushman Intellectual Property Group of Pillsbury Madison & Sutro LLP

[57] ABSTRACT

A process for the production of corrosion-protected metallic materials by passivation is described, in which a layer of an intrinsically conductive polymer is deposited on the metallic material, and the coated metallic material is brought into contact with oxygen-containing water until the equilibrium potential is reached, with polyaniline in particular being used as conductive polymer.

20 Claims, 9 Drawing Sheets

PROCESS FOR THE PRODUCTION OF CORROSION-PROTECTED METALLIC MATERIALS AND MATERIALS OBTAINABLE THEREWITH

BACKGROUND OF THE INVENTION

The invention relates to a process for the production of corrosion-protected metallic materials by passivation and to the materials obtainable therewith.

The passivation of metals, in particular of aluminium, is known. Aluminium is passivated, albeit to an insufficient extent, by reaction with atmospheric oxygen. On an industrial scale, electrolytic oxidation is used for its passivation (Eloxal process) in which, however, electricity consumption and the use of toxic chemicals are disadvantageous on ecological grounds.

Electrolytic passivation of iron and steel has been hitherto practically impossible or only realisable to an insufficient extent. Steel, as stainless steel, is passive in an acidic medium through the presence of, inter alia, chromium oxides, but very susceptible to pitting since there is no dense homogeneous passive layer. Iron can be temporarily passivated by strong acids against acid attack, but the passive layer is very easily damaged.

The corrosion protection of steel is still an enormous ecological problem and, because of the destruction of supporting structures, machinery and buildings, also a great economic problem. As before, steel has to be protected essentially passively by top coats, i.e. the admission of water and oxygen and salts must be prevented. However, particularly in crevices, at damaged sites of the paints and because of ageing, the traditional paints fail to work and must therefore be replaced at regular intervals. To a certain extent, an "active" protection is achieved through zinc coating, whereby the iron acts as a cathode and is therefore protected cathodically; cathodic protection also takes place through using sacrificial anodes or by applying a suitable voltage.

Observations of a corrosion-protection effect of intrinsically conductive polymers, above all of polyaniline, have been made on several occasions in former years. Thus, A. McDiarmid reported at a conference (ICSM 1986, Kyoto) during a lecture on the electrochemical deposition of polyaniline under anodic potential onto steel and on the observation that the electrochemically coated steel plate was more resistant to corrosion than an uncoated steel plate. This observation was also made by D. DeBerry in the case of stainless steel, onto whose surface polyaniline had been deposited by electrochemical means (J. Elektrochem. Soc. 132, 1022 (1985)). The disadvantages of this procedure are that a) an electrochemical coating with polyaniline is not feasible in practice on a commercial scale, and b) it was not possible to explain what the reason for the observed corrosion-protection effect was.

In WO 89/02155, polyaniline-containing paint dispersions have been proposed for the first time with which a corrosion-protection effect was obtained. The described process for corrosion protection and the proposed formulations have not, however, proved successful in practice since a) the corrosion-protection effect was not satisfactory and was not sufficiently reproducible, b) the paint formulations did not satisfy the requirements of the paint and coatings industry, e.g. as regards coating behaviour, paint adhesion, pore formation, water and oxygen migration values.

Encouraged inter alia by the observations of A. McDiarmid, a working group from the Los Alamos Laboratories, acting on behalf of NASA, likewise carried out corrosion studies with polyaniline-coated steels. This study team coated steel plates with neutral and non-conductive polyaniline from solution, then carried out a "doping" with various "doping" agents and coated this composite structure with corrosion-protection paint. A summary of the results of the studies can be found in Project Report LA-UR-92-360 of the Los Alamos National Laboratories (K. Thompson et al., 1991). Although the Los Alamos Laboratories were able to achieve a certain corrosion-protection effect, they did not achieve the aim of reliably protecting the steel structure against HCl in the corrosive atmosphere of launching boosters during space shuttle launches. In particular, the reproducibility of the corrosion-protection effect left much to be desired; further, there were no details given regarding a possible shift of the corrosion potential. Thus, the authors argue inter alia that the corrosion-protection effect depended on the chemical nature of the doping agent. In summary, the process permits no commercial implementation since the corrosion-protection effect is not reproducible and cannot be represented in a quantitative manner, and the adhesion of the top coat layer is inadequate.

In 1991 a working group from the companies Zipperling & Co. (Ahrensburg, Germany), Americhem Inc. (Akron, Ohio, USA) and Allied Signal (Morristown, N.J., USA) developed various formulations for corrosion-protection paints which led to patent application PCT/US93/00543 (WO 93/14166). The inventors were able to show that in a systematically applied salt-spray test according to ASTM B-117, the various polyaniline-containing paint formulations brought about a reduction in the rate of corrosion. There were, however, several disadvantages opposing practical application of the paint formulations proposed there:

a) the high production costs caused by the required long dispersion time of the polyaniline in the paint formulation, b) a poor reproducibility of the corrosion-protection results when transferring from the laboratory scale to larger, practical experimental scales, c) from the point of view of corrosion-protection practitioners, only small corrosion-protection advantages as against clearly increased paint and coating costs, d) the sometimes very low paint adhesion and therefore an intensification of the corrosion attack through infiltration in the case of most polyaniline-containing formulations.

It is therefore the object of the invention to make the corrosion-protection effect observed in various independent laboratory investigations with intrinsically conductive polymers unequivocally and without exception reproducible by a precisely explicable process, to make the corrosion-protection effect controllable and to make available corrosion-protected metallic materials in which the rate of corrosion is reduced by at least 50% compared with conventional corrosion-protection systems.

SUMMARY OF THE INVENTION

The process according to the invention for the production of corrosion-protected metallic materials is characterized in that the steps (a) and (b) defined below and optionally steps (c), (d) and/or (e), are carried out, namely (a) a layer of an intrinsically conductive polymer capable of absorbing water, which has a redox potential against normal hydrogen electrode of −300 to +1800 mV, is applied on a metallic material in non-electrochemical manner, and (b) the metallic material coated according to step (a) is brought into contact with a passivating medium containing oxygen-containing water for a period of at least 30 seconds and preferably until the equilibrium potential is reached, and, after steps (a) and (b) have been passed through, (c) optionally a repassivation is carried out, by bringing the metallic material, for a period of at least 1.5 minutes, to a potential which is 50 to 500 mV more negative (against normal hydrogen electrode) than the equilibrium potential of the metallic material coated with the conductive polymer, working at zero current or with less than 2 mA/cm$^2$, (d) optionally the layer of the intrinsically conductive polymer is removed and (e) optionally the metallic material is provided with a corrosion-protection covering.

In accordance with the detailed description of the invention which follows, when considered in light of the attached figures, additional objects, features and advantages of the present invention will become apparent.

DETAILED DESCRIPTION OF THE INVENTION

The invention summarized above will now be described in more detail by reference to certain preferred embodiments and illustrative and comparative examples.

Process Step (a)

To carry out the process according to the invention, firstly in process step (a), an intrinsically conductive polymer capable of absorbing water is applied in neutral and preferably in doped, in particular protonated, form on the metallic substrate, such as e.g. steel, stainless steel, copper, aluminium or bronze or other alloys, by non-electrochemical means.

"Intrinsically conductive polymers" are understood to be those organic polymers which have polyconjugated bond systems (e.g. double bonds, aromatic or heteroaromatic rings or triple bonds). Examples of such polymers are polydiacetylene, polyacetylene (PAc), polypyrrole (PPy), polyaniline (PAni), polythiophene (PTh), polyisothianapthene (PITN), polyheteroarylene vinylene (PArV), the heteroarylene group being possible to e.g. thiophene or pyrrole, poly-p-phenylene (PpP), polyphenylene sulphide (PPS), polyperinaphthalene (PPN), polyphthalocyanine (PPhc) and their derivatives (which are formed e.g. from substituted monomers), their copolymers and their physical mixtures. They can exist in various states, which are described in each case by different empirical formulae and can be converted into one another, in most cases in essentially reversible manner, by (electro-) chemical reactions such as oxidation, reduction, acid/base reactions or complexation. These reactions are sometimes also called "doping" or "compensation" in the literature or can be regarded as "charging" and "discharging" by analogy with the electrochemical processes in batteries. At least one of the possible states is electrically very conductive, e.g. has a conductivity of more than 1 S/cm (as pure substance), so that it is possible to talk of intrinsically conductive polymers.

A good overview of intrinsically conductive polymers already synthesized to date, which are suitable according to the invention, can be found in Synthetic Metals, Volumes 17, 18 and 19 (1987).

Used as intrinsically conductive polymers are those which have a redox potential of −300 to +1800 mV, measured against normal hydrogen electrode. Preferably used as intrinsically conductive polymer is polyaniline (e.g. polyaniline obtainable commercially under the trade name VERSICON, manufacturer: Allied Signal, Morristown, N.J., USA).

Used as doping agents are preferably inorganic or organic acids, in particular phosphoric acid, hydrochloric acid, sulphuric acid, organic sulphonic acids, such as para-toluene sulphonic acid, dodecyl benzene sulphonic acid, benzene sulphonic acid or methane sulphonic acid, or acetic acid.

The water absorbency of the polymers used is preferably at least 0.5 wt. % and particularly preferably at least 1.0 wt. %, relative to the dry weight of the deposited polymer coating.

The polymers are deposited in a non-electrochemical manner. This means that electric current is not used to apply the polymer on the metal. Instead, in the coating procedure according to the invention, the substrate can be applied for example by bringing the substrate into contact e.g. with a dispersion of the selected polymer, such as polyaniline, in organic solvents or water. Such dispersions are described in DE-PS 38 34 526. Practical tests have shown that the obtained polymer coatings should advantageously have a thickness of at least 30 nm. To obtain such a coating thickness, the coating is carried out several times in succession with e.g. a polyaniline dispersion. This is preferably performed such that the substrate is dipped briefly into the polymer-containing solution and then dried. This coating and drying process is preferably repeated at least 2–3 times. It has been shown that more than 5 to 10 coating procedures, combined with the other process steps, do not lead to a further improvement in the corrosion-protection effect.

Alternatively, the polymer can also be deposited by allowing the dispersion to act upon the metallic substrate until the desired layer thickness has built up.

It is also possible to use polymer blends capable of absorbing water containing preferably 0.1 to 45 wt. % and particularly preferably 5 to 35 wt. % intrinsically conductive polymer in place of the pure intrinsically conductive polymers.

Just like the pure polymers, the polymer blends which can be used have a water absorbency of preferably at least 0.5 wt. % and particularly preferably at least 1.0 wt. %, relative to the dry weight of the polymer blend coating.

In addition to intrinsically conductive polymer, the polymer blends used according to the invention contain other polymers, copolymers or polymer mixtures, such as e.g. polyamides, polyesters, polyethers, such as polyethylene oxides, copolymer latices based on water, such as e.g. vinyl acetate butyl acrylate, or other copolymer latices, and/or polyvinyl alcohols. Particularly preferred other polymers are polyamides.

It is further preferred that the polymer blend contains additives which increase the water absorbency. Examples of these are sulphonates, alcohols, ethers and lactones.

If the polymer blends are used in the form of paint formulations, then a polyaniline redispersed with butyrolactone according to German Patent Application P 43 17 010.2 is preferably used as intrinsically conductive polymer. It is of particular advantage that this pre-dispersion increases the water absorbency of the polymer blend once more.

A particular advantage with using polymer blends instead of pure intrinsically conductive polymer, such as polyaniline, is that in the case of polymer blends, an excellent corrosion-protection effect is obtained even when the thicknesses of the coating deposited on the metallic material are great, e.g. more than 300 nm, such as 5 to 300 µm. This is to be recognised by a very much stronger shift of the corrosion potential and lowering of the rate of corrosion compared with a coating of pure conductive polymer which is formed from the same quantity of conductive polymer as the polymer blend coating contains.

Process Step (b)

In order to further implement the process according to the invention, in process step (b) the metallic substrate coated with the polymer is brought into contact with a passivating medium containing oxygen-containing water for a period of at least 30 seconds and preferably until the passivation reaction has stopped, i.e. until a constant cell voltage in a corrosion potential measuring cell according to DIN 50918, Number 3.3.1.4. has been reached.

Instead of measuring the potential of the sample in the measuring cell according to DIN, the potential of the coated metal part can also simply be measured against a reference electrode or its pattern during the passivation reaction followed. Here, of course, no voltage is applied from outside. A measurement of the potential can be dispensed with if the chronological pattern of the passivation is known, although earthing or other discharge measures should be taken where necessary to avoid undesired polarisation which could inhibit the passivation.

It has been shown that coating a metal, such as iron, steel, copper, aluminium, or other metallic materials, including alloys, such as e.g. bronze or aluminium casting alloys, with the intrinsically conductive polymer alone in process step (a) does not suffice as corrosion protection. Surprisingly, however, this coating does represent a prerequisite for such a protection, since it is only with its assistance that the coated metal substrate is passivated in satisfactory manner upon sufficiently long contact with the passivating medium, such as e.g. oxygen-containing water.

This unexpected result thus provides at the same time an explanation for the imperfect reproducibility of the conventional processes. With these, attempts had been made to combine the assumed corrosion-protection effect of the polyaniline with the necessary barrier function of the paints, and to keep water and salts away because of their corrosive effect. Consequently, in all these processes, the contact of the polymer coating with oxygen-containing water or the presence of oxygen-containing water at the boundary surface between metal and polymer coating had been hindered or prevented by the choice of process conditions, or at least had not been controlled. This was e.g. also the case with K. Thompson et al., (Los Alamos National Laboratories, Project Report LA-UR-92-360, 1991). Firstly, this working group covered metals which had been coated with intrinsically conductive polymers also with a water-impermeable epoxy top coat, before a corrosion test was carried out in water. Limited corrosion-protection successes were therefore obtained with this and the other known processes only if, by chance, a sufficient quantity of oxygen-containing water was available at the interface between metal and conductive polymer.

Further investigations have shown that the process according to the invention produces particularly good results when oxygen-containing water having a conductivity of at least 20 µS is used as passivating medium. Salt-containing water containing e.g. 0.1 mol NaCl is therefore also preferably used. Finally, it was shown that passivation can be achieved even through contact with oxygen-containing dilute aqueous acid solutions as the passivating medium.

It is surprising that, despite the presence of corrosive substances such as oxygen, water, NaCl and even acids, the process according to the invention leads to very well corrosion-protected metallic materials. It was not to be expected that some of these substances are absolutely necessary or even advantageous in order to achieve the desired corrosion-protection effect.

The passivation reaction is preferably carried out until it has finished. The time span required for this is substance-dependent and ranges from a few minutes to several hours, namely until the cell voltage in a corrosion potential measuring cell according to DIN 50918, Number 3.3.1.4. is constant (or until an equilibrium potential in an industrial measuring arrangement is reached). It is to be ensured in each case that the reaction is carried out for at least 30 seconds.

Contact between the coated metal and the oxygen-containing water can take place in various ways. Thus, the workpiece can simply be dipped into the water and in particular larger metal structures, such as e.g. bridges, can also simply be sprayed with the water.

The rate of passivation can surprisingly be increased by the presence of suitable additional oxidising agents in the aqueous electrolyte and by increased temperature. Thus, the equilibrium potential is established for example in the presence of $Fe(III)$ ions within a few minutes, whilst it mostly takes more than ½ an hour to several hours in an electrolyte only containing oxygen. In addition to $Fe(III)$ ions, other substances also come into consideration as oxidising agents, such as e.g. ammonium peroxodisulphate, potassium permanganate and/or hydrogen peroxide.

Process step (b) is usually only carried out after step (a) has finished and the coating has dried. It is however also possible, in particular in the case of water-dispersible conductive polymers, to carry out both steps at the same time. That is to say, that at the same time as the polymer coating is developing, the passivation reaction in the aqueous medium is already starting.

It is an important advantage of the process according to the invention that the metallic workpieces produced with its help are particularly well protected against the corrosive attack by acid media which occurs very frequently in practice. This is proven by current density/potential curves, recorded in dilute aqueous acids, of workpieces according to the invention, which are shifted to very noble potentials and show only a very small corrosion current over a wide potential range.

A further advantage of the process according to the invention is that it effects a protection against further corrosion even in the case of metallic materials which are already corroded. In practice, the corroded materials are firstly freed from adherent loose rust and then subjected to the process steps (a) and (b) according to the invention. This treatment is preferably followed by the depositing of a protective covering according to process step (e). Workpieces treated in this way display no new rust formation or blistering or infiltration, even after several months' outside weathering.

For particularly demanding corrosion-protection tasks, such as e.g. "heavy corrosion protection" or passivation against acid condensates in waste-air systems of power stations and heating installations, the spontaneous passivation achieved by process step (b) does not suffice under certain circumstances. The passivation effect can, however, be increased by a further process step (c) which is carried out if necessary.

Process Step (c)

This process step (c), which is surprising in its effect, is a cathodic repassivation in which the metal coated with the polymer and passivated in aqueous media is brought to a potential which is at least 50 mV, and at most 500 mV, more negative than its equilibrium potential relative to the normal hydrogen electrode (measured in a potential measuring cell according to DIN 50918, Number 3.3.1.4.). If this potential state is maintained for longer than 1.5 minutes, the rate of corrosion is again significantly reduced and the corrosion-protection potential is shifted to noticeably more positive potentials. It is important to work at zero current or with only a minimum current density of $\leq 2$ mA/cm$^2$.

This process step is surprising in its effect in as much as the common explanation for the effect of conductive polymers as corrosion protection on metal surfaces is that the iron is positively polarised vis-à-vis the polyaniline (polyaniline is the more noble metal). The fact that a potential shift of the coated iron in the cathodic direction brings about an increase in the presumably anodic passivation, is therefore surprising and thus far still inexplicable.

Both process steps, the passivation in the presence of oxygen-containing water and the cathodic repassivation, therefore obviously proceed according to complicated reaction mechanisms which are still not yet understood today. These steps lead, however, to the formation of a "passivation layer", as is shown by scanning electron microscope pictures of surfaces of metal substrates, from which the polymer coating was carefully removed after passivation was carried out according to steps (b) and/or (c). This passivation layer is obviously an as yet unknown material.

This can already be seen from the fact that the potential/current density curve, which is specific to a substance, of a metal workpiece according to the invention having such a passivation layer clearly differs from that of a metal workpiece which was not passivated by means of the process according to the invention. The potential/current density curve of a steel sample corrosion-protected according to the invention also clearly differs from that of a steel sample with superficial initial rusting. This in turn means that the passivation layer is also not merely a layer of conventional oxidic iron compounds which form during rust formation. In analogous manner, this can also be proven e.g. in the case of copper and aluminium with which is also found after passivation according to the invention a different potential/current density curve, shifted to more positive potentials than in the case of the corresponding spontaneously oxidically covered workpieces.

It is possible that the obtained passivation layer is an unknown modification of an oxide of the metal concerned or an oxidic complex of the intrinsically conductive polymer with the metal substrate. Thus, in the case of steel samples which according to the invention were coated with polyaniline, passivated and then carefully freed from the polyaniline coating, carbon, and in a secondary quantity, nitrogen were also detected by means of AUGER spectroscopy in addition to oxygen and the metal concerned as constituents of the obtained passivation layer.

It is therefore unclear whether the process according to the invention actually leads to a passivation reaction in the classic sense which is distinguished by precisely the formation of metal oxide coating layers on the metal substrate to be protected. For this reason, the term "passivation" used in the description and the claims is to be interpreted generally as treatment which leads to the protection of the metal substrate against corrosion, in particular by shifting the corrosion potential to more positive values.

Process Step (d)

In a further process step (d), in order to improve the adhesion of an optionally desired corrosion-protection covering, the polymer coating can be removed. This should be carried out in such a way that the formed passivation layer is not damaged. The polymer coating can be removed particularly easily if it has a high layer thickness and, in addition, a cathodic repassivation according to process step (c) was also carried out. In this case, soft brushes and optionally the use of solvents such as methanol suffice to remove the polymer coating completely. The changed colour compared with the untreated substrate showing metallic luster, which change is the result of the passivation which has been carried out, then becomes visible. The metal surface is now matt and greenish-grey in the case of steel and matt and greyish in the case of aluminium, and in both cases mostly dark-coloured spots stand out against areas with a lighter, grey matt finish.

It is however also possible to leave the polymer coating on the metallic material. The advantage of this method is that a permanent repassivation of the material is made possible in this way, even after injury or damage.

Process Step (e)

If required, in process step (e) the passivated metallic workpiece can, after optional drying, also be coated with another corrosion-protection covering which is usually called the barrier layer or top coat. Its type is determined according to practical requirements and the later intended use of the metallic workpiece. It is merely to be noted here that, if the polymer coating is removed according to process step (d), the protective paint should be deposited quickly in order to prevent a disadvantageous changing of the passivation layer, recognizable by a colour change, e.g. in the case of steel by a slight greenish cast of the grey matt areas to a brownish shade. For this, one has, however, several minutes' time, with the result that there are no practical hindrances to further conventional protective painting.

Used as protective covering materials are primarily conventional epoxy paints, (e.g. Eposyst 2000 from Wilckens), alkyd resin paints or PVC paints. A particularly preferred protective covering is obtained by depositing on the metallic workpiece, firstly a polymer blend containing polyaniline and based on polyamide and then an epoxy top coat. This type of protective covering has proved to be e.g. very advantageous if already corroded materials are to be protected against further corrosion.

Finally, an improved adhesion of a protective paint and, surprisingly, also a further shift of the current density/potential curve to even more positive potentials can be attained if the metallic workpiece is phosphate-coated prior to being coated in process step (a). Phosphate-coating treatments are usually carried out only in order to effect an improved adhesion of organic paints on the metals to be coated. In general, however, no independent corrosion-protection effect is attributed to the phosphate-coating treatment. Surprisingly, the carrying out of the passivation with a phosphate-coated steel sample has, however, brought about not only an improved adhesion of the polyaniline coating and of the traditional protective paint, as expected, but also another clear shift of the corrosion potential to more positive potentials. Whether this has electrochemical causes or is merely to be attributed to the fact that the metal sample becomes more porous during phosphate-coating and a larger surface area for the passivation reaction is therefore available, has not yet been explained.

BRIEF DESCRIPTION OF THE DRAWINGS

FIGS. 1, 2 and 3, for uncoated metal samples (Example 1);

FIG. 4, according to the present invention (Example 3);

FIG. 5, according to the present invention (Example 4);

FIG. 6, a comparison test (Example 4);

FIGS. 7 and 8, for copper and aluminum substrates (Example 5) according to the present invention;

FIG. 9, according to the present invention (Example 6);

FIG. 10, according to the invention with neutral polyaniline (Example 8);

FIG. 11, according to the invention for a phosphate-coated steel sample (Example 9);

FIGS. 12 and 13, according to the invention with polymer blends (Examples 10–11);

FIG. 14, according to the invention with already rusted steel samples (Example 16);

FIG. 15, according to the invention with high grade steel (Example 17);

FIG. 16, according to the invention with acidic media (Example 18);

FIG. 17, according to the present invention (Example 3).

The invention is described below with reference to examples.

EXAMPLES

Example 1

Construction of the Measuring Cell and Sample Preparation

The corrosion potential-corrosion current curves were recorded in all examples according to DIN 50918, number 3.3.1.4. The metallic workpieces were positioned according to the DIN instructions at the position of the measuring electrode M. The potential/current curves were recorded, unless stated otherwise, in the case of all examples in 1 molar aqueous NaCl solution in order to be able to compare the individual results with each other.

All workpieces were pre-treated as follows prior to measurement and prior to the subsequent treatments:

trimming and straightening of the edges of the small sheets with a file dry-grinding with emery cloths having 50 and 100 coarseness regrinding with emery cloths of 100 and 200 coarseness triple degreasing with ethyl acetate (1st and 2nd time with a brush, the 3rd time with ultra-sound).

Figure 1:
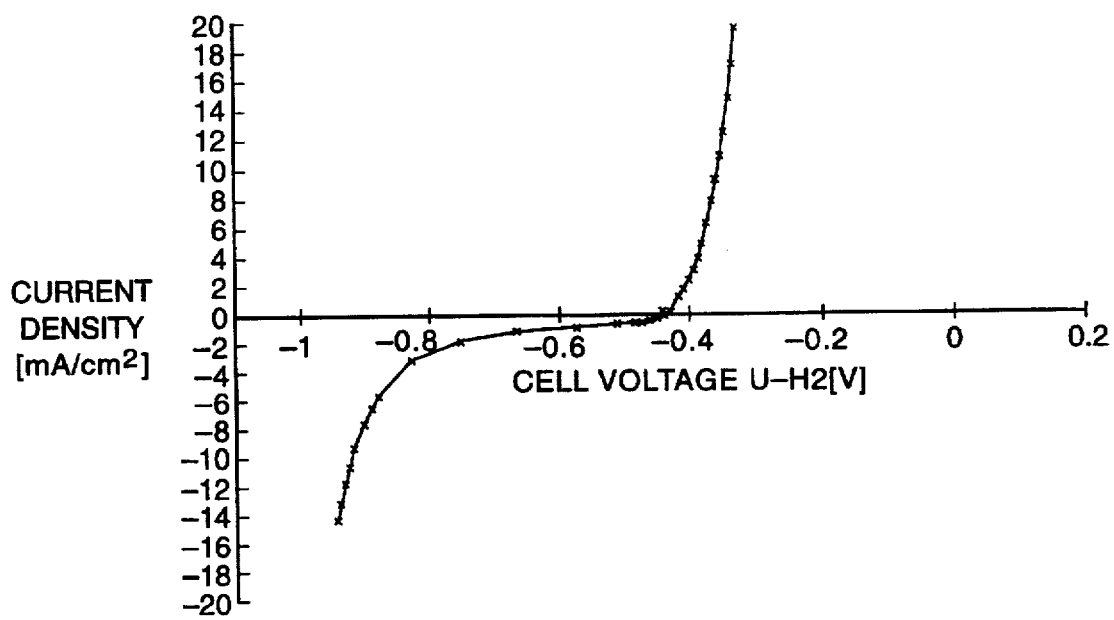
FIGS. 1–17 each show current voltage curves as follows.
Figure 2:
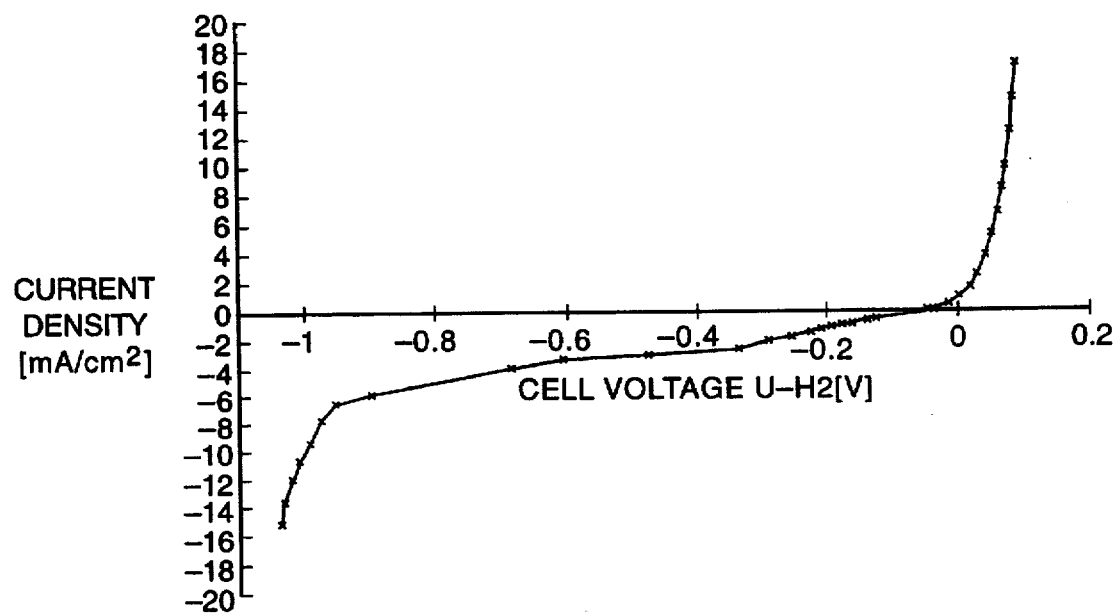
Figure 3:
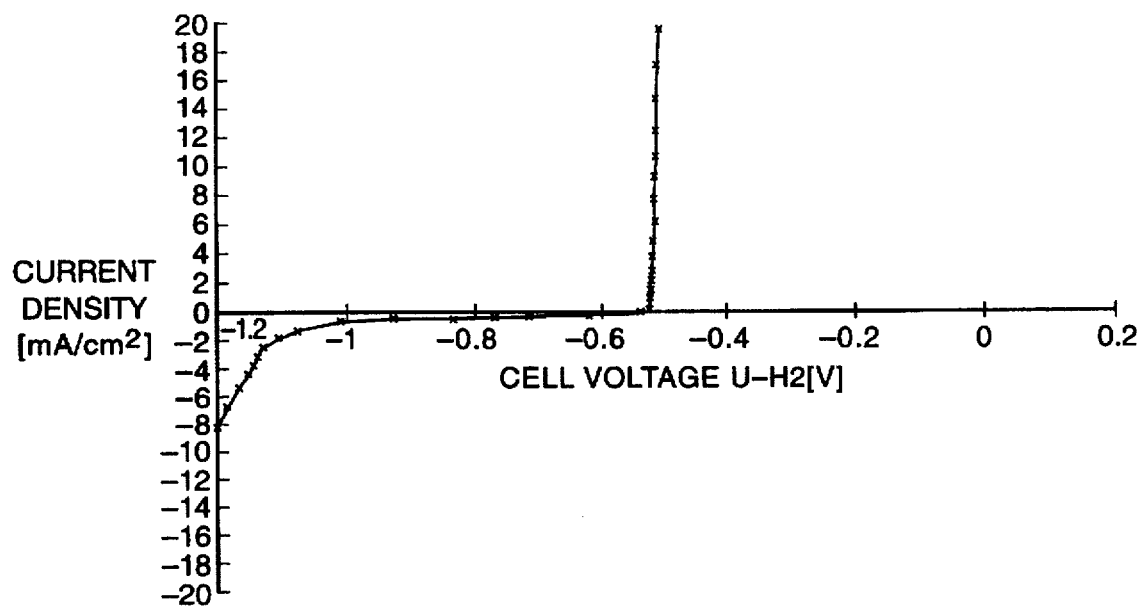

Uncoated samples of (a) steel ST 37, (b) copper and (c) aluminium were passed through cathodically and anodically as comparison. The potential/current curves reproduced in FIGS. 1, 2 and 3 resulted.

The independent passivation of the aluminium was recognizable from the fact that the original potential shifted to more positive potentials within a few seconds and only then could an anodic measurement section be passed through.

Example 2

Coating with Pure Polyaniline

Metallic workpieces pre-treated according to Example 1 were coated by immersing into a dispersion of polyaniline in organic solvents. The dispersion was produced according to the teachings of DE-PS 38 34 526.9 and EP-OS 168 620, DMSO serving as solvent and polyaniline being used which had been doped with dodecyl benzene sulphonic acid (DBSH). Pre-warming the samples to 100° C. proved successful during coating, before they were brought into contact with the polyaniline dispersion and then dried. This coating cycle was carried out at least twice.

Unless mentioned otherwise, workpieces were used in the following examples which had passed through a total of 10 coating cycles. Also, unless stated otherwise, polyaniline doped with dodecyl benzene sulphonic acid (DBSH) was used in all examples.

Example 3

Passivation of Steel Samples

Several steel samples (steel type ST 37) were coated according to Example 2.2, 3, 5, 10 and 20 coating cycles were carried out. The samples were then immersed in 1 molar aqueous NaCl solution (80 mS/cm). A potential of 300 mV established. In the course of approximately 30 to 60 minutes, an equilibrium potential of 620 mV established, quickly at first and then increasingly slowly. To be on the safe side, in this and in the subsequent experiments, the establishment of the equilibrium potential was awaited for a period of over 16 hours in order to ensure exactly reproducible test conditions.

Figure 4:
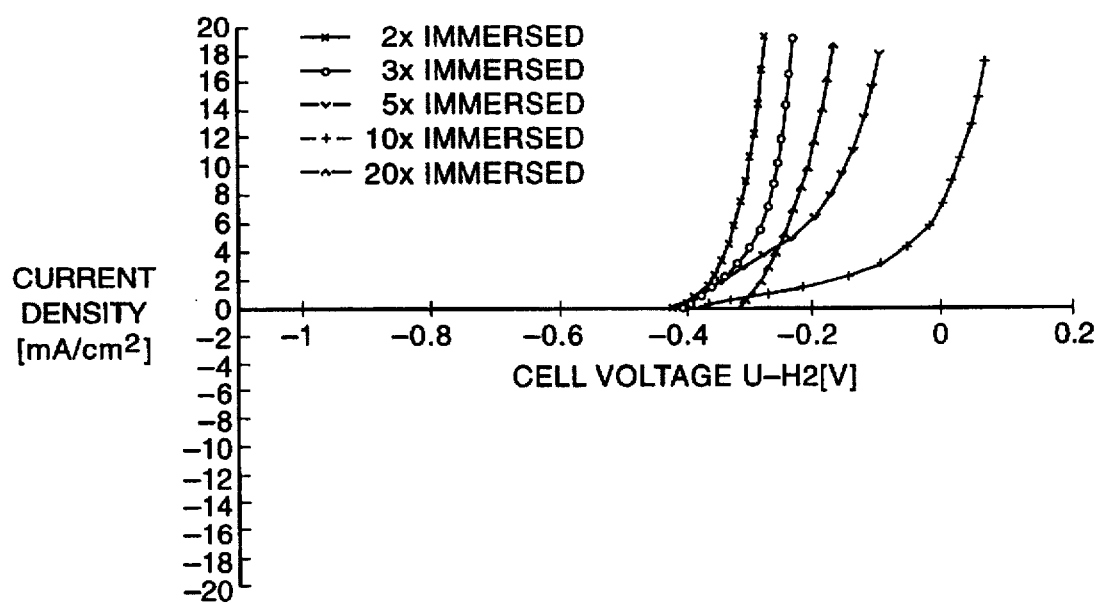

When the current/potential curve of the steel samples was recorded immediately after conducting of the coating step, practically no shift or change compared with the curve for an uncoated steel sample (FIG. 1) was observed. The same behaviour was also noted for copper and aluminium samples. However, when measurement was carried out after establishment of the equilibrium potential, curves shifted to more noble potentials were obtained, from which it was evident that, with comparable potentials, a corrosion current reduced by at least 50% was flowing (see FIG. 4).

Figure 17:
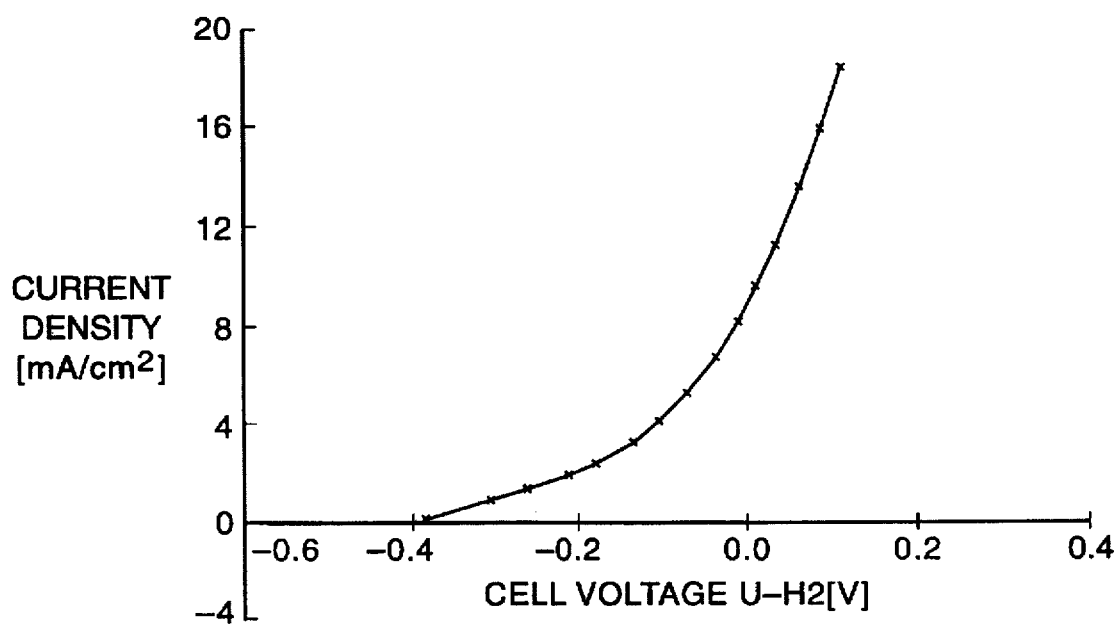

This result was also obtained when the equilibrium potential was established in oxygen-containing distilled water or oxygen-containing tap water. For a steel sample passivated in this way, which had been coated beforehand according to Example 2, the current/potential curve reproduced in FIG. 17, which differed only slightly from the curve shown in FIG. 4, was obtained in 1 molar aqueous NaCl solution.

Example 4

Cathodic Repassivation

Figure 5:
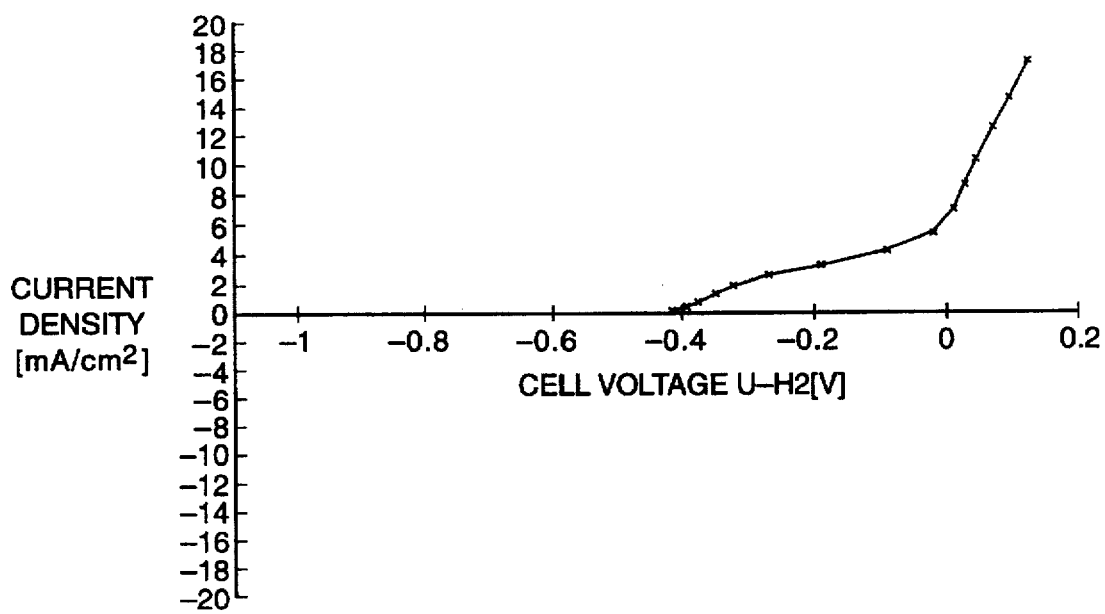

A steel sample coated according to Example 2 was cathodically polarised at a potential of −0.55 V following passivation according to Example 3. A current of less than 1 mA/cm$^2$ flowed. FIG. 5 shows the obtained potential/current curve shifted to more positive potentials.

Figure 6:
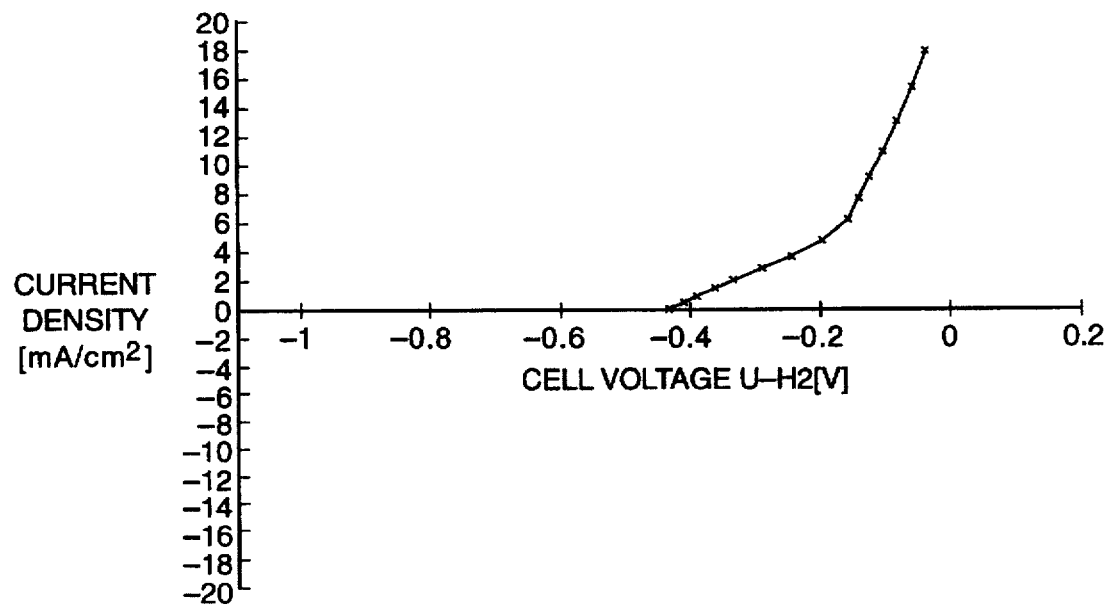

In a comparative test, cathodic repassivation was carried out at a still lower potential, with the result that a current of more than 2 mA/cm$^2$ flowed. This led to the current/potential curve being shifted back again to more negative potentials, which is synonymous with facilitated corrosion attack (FIG. 6).

Example 5

Figure 7:
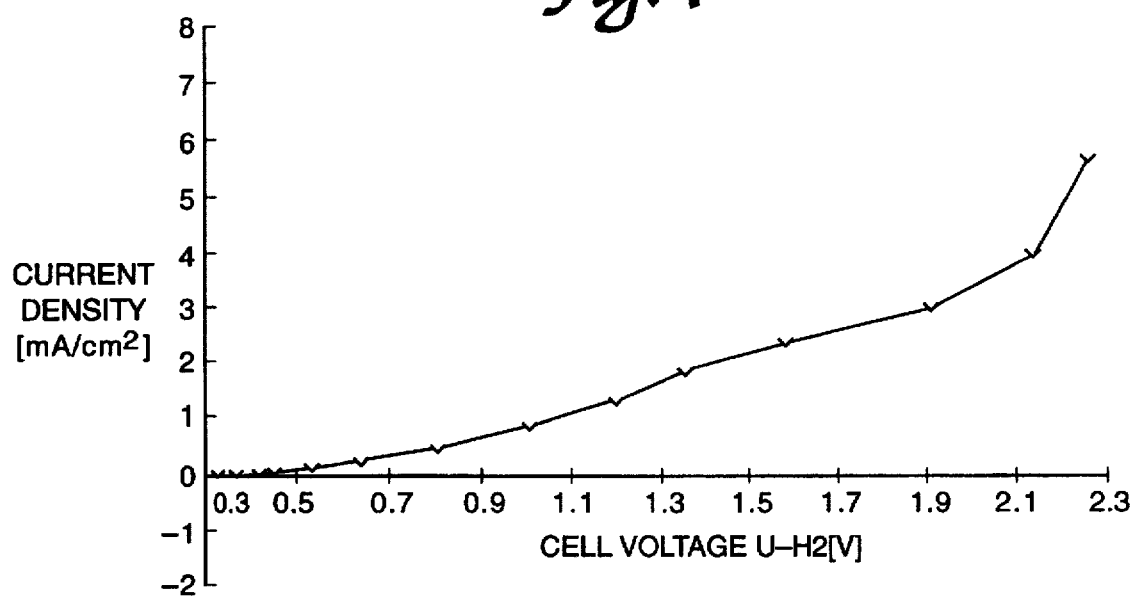

Copper samples coated and passivated according to Examples 2 and 3 showed the current/potential curve represented in FIG. 7.

Figure 8:
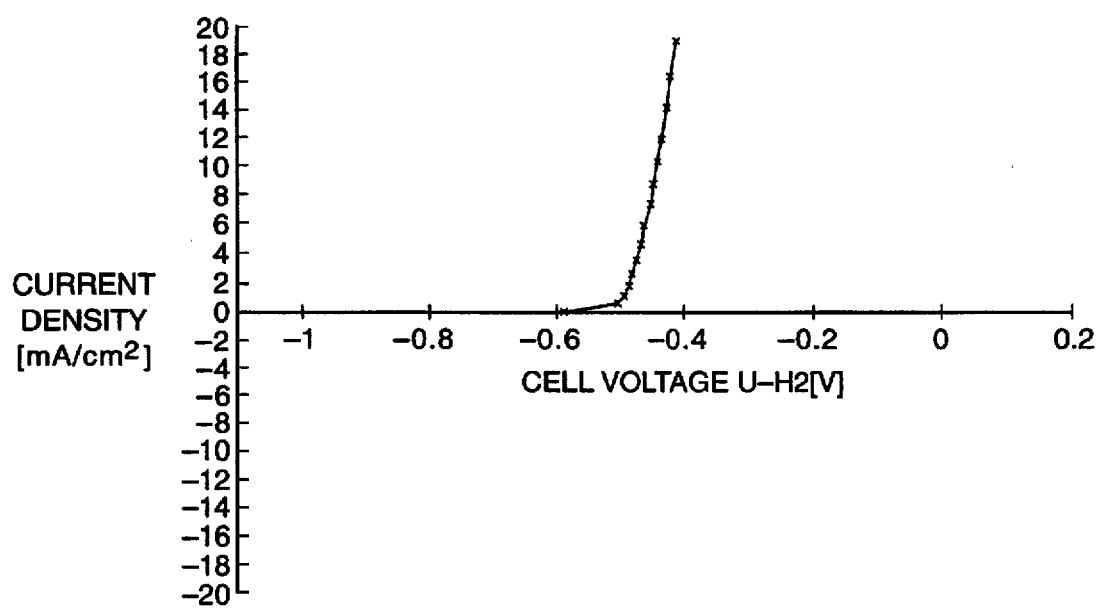

Aluminium samples coated and passivated according to Examples 2 and 3 showed the current/potential curve represented in FIG. 8.

Both curves prove the marked reduction in the corrosion current that is brought about by the process according to the invention also in the case of copper and aluminium.

Example 6

Figure 9:
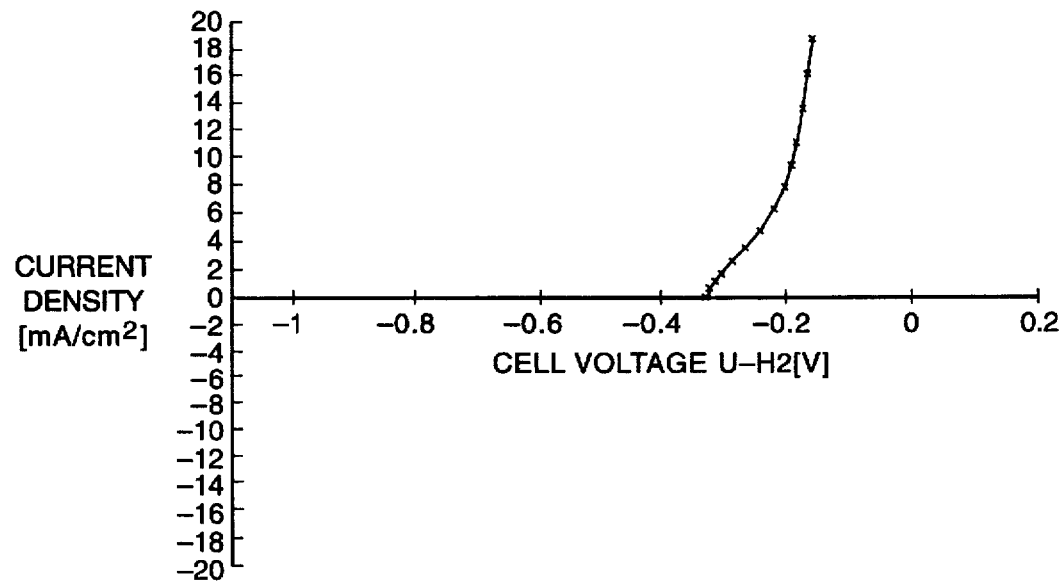

Steel samples coated according to Example 2 (20 coating cycles) and then passivated according to Example 3 were carefully freed of the polyaniline. A soft brush was used for this purpose. In contrast to the areas of the metallic workpiece not dipped in water, the areas of the sample which had come into contact with water were no longer showing metallic luster, but were greyish matt with a slightly greenish shimmer. Darker spots on an overall light-grey matt surface were visible. The current/potential curve for the steel samples thus treated is shown in FIG. 9. It clearly differs from that of a steel workpiece untreated for comparison (cf. FIG. 1).

A further test showed that the polyaniline could be removed particularly easily if a steel sample was passivated and also cathodically repassivated, after passing through a considerable number of coating cycles, e.g. 20 cycles. The grey coloration was then more noticeable, the workpiece was more matt and more numerous and larger dark spots on a lighter background were to be found.

Examination of the steel samples using a scanning electron microscope (CamScan CS 24—equipment from the company Cambridge Scanning Co. Ltd., Cambridge, England) with coupled-on energy-dispersive X-ray spectroscopy analysis equipment from the company EDAX International, Mahwah, USA, showed that a material layer having a high oxygen content had been deposited on their surface. In order to further clarify the composition of this layer, the surface of the samples was investigated in more detail by means of AUGER spectroscopy. The result of the AUGER analysis was that the following elements were identified.

| Element | Position (eV) | Atom concentration (%) |
|---|---|---|
| Fe 700 | 697.50 | 11.65 |
| Fe 645 | 643.50 | 13.70 |
| Fe 589 | 584.00 | 25.98 |
| O 503 | 507.00 | 18.03 |
| Cl | 179.50 | 0.45 |
| C | 263.00 | 29.65 |
| N | 375.00 | 0.53 |

What is striking is the high oxygen (O) and carbon (C) contents as well as the nitrogen (N) content. It is therefore completely possible that the passivation layer is an oxidic complex of the metal with a derivative of the polyaniline used or a reaction product of a metal oxide modification with a polyaniline derivative.

Example 7

Steel workpieces (ST 37) treated according to Examples 3 and 4, and ones which remained untreated for comparison purposes, were coated with a conventional PVC corrosion-protection paint (vinyl chloride-vinyl acetate copolymer paint from the company Hagebau, called "Hagebau Fl üssigkunststoff") and tested in a salt spray test according to DIN 50021. The untreated workpieces were already noticeably corroded after a few days, whilst in the case of the treated workpieces no corrosion was to be observed, even after 10 days' storage.

Example 8

Coating with Neutral Polyaniline

Figure 10:
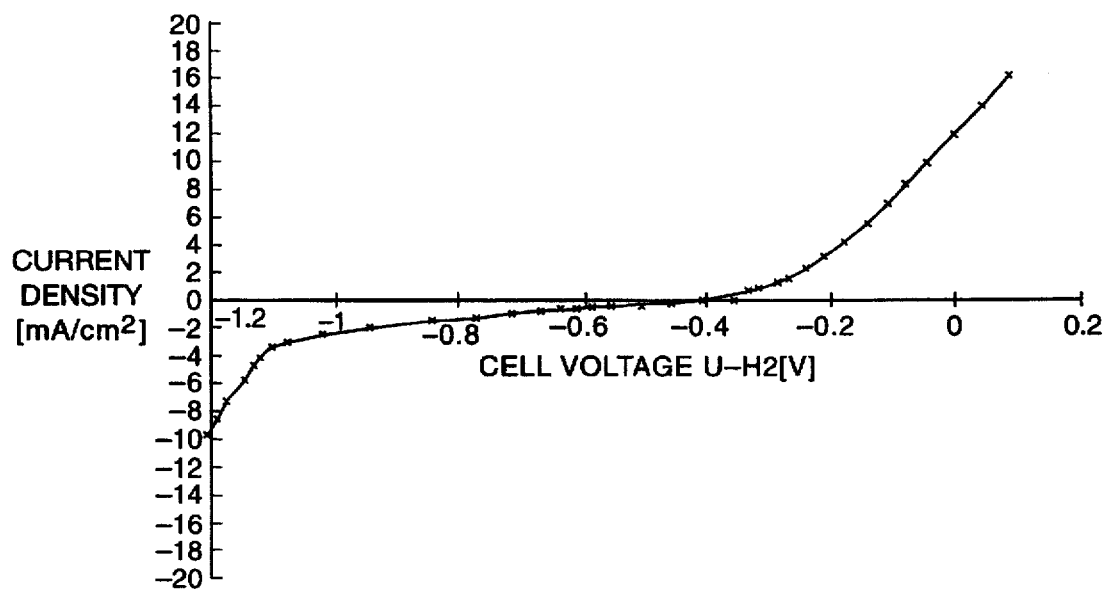

Steel workpieces (ST 37) were coated according to Example 2 and passivated according to Example 3. However, a coating with neutral, i.e. non-doped polyaniline from solution or dispersion was deposited. The corresponding current/potential curve shown in FIG. 10 has also shifted to more positive potentials and proves that even with neutral polymer a corrosion-protection effect can be achieved.

Example 9

Phosphate-Coated Steel Sample

A steel workpiece (ST 37) was pre-treated according to Example 1 and cleaned and pickled after the described cleaning with phosphoric acid $H_3PO_4$. After rinsing, zinc phosphate was galvanically deposited onto the workpiece in accordance with DIN 50942 from a zinc dihydrogen phosphate solution ($Zn(H_2PO_4)_2$) in a layer thickness of approx. 20 μm. The subsequently rinsed and dried sample was then coated according to Example 10 with the paint described there and passivated according to Example 3.

Figure 11:
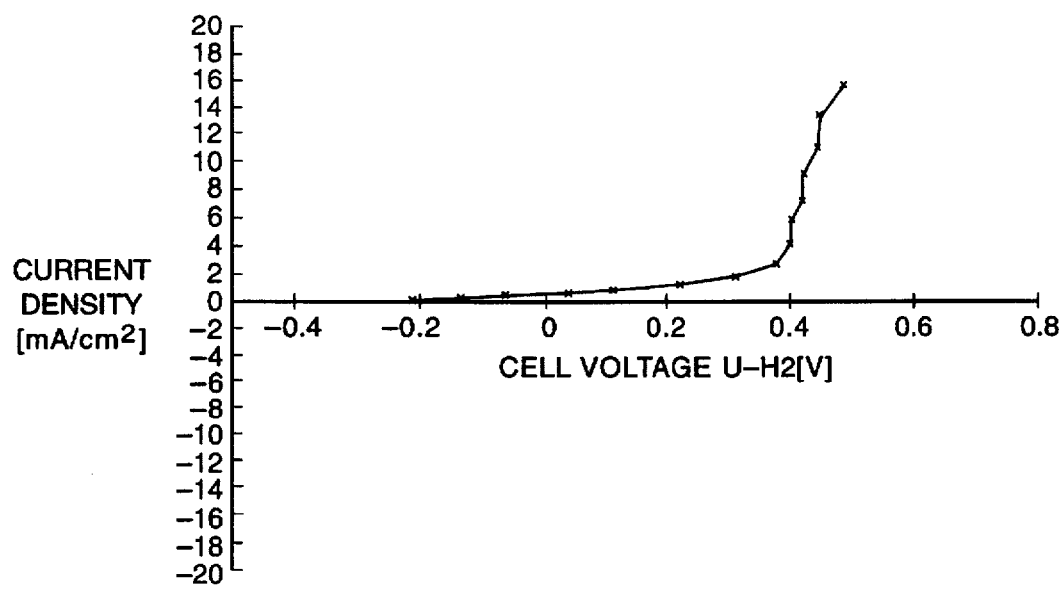

The current density-potential measurement resulted in the curve shown in FIG. 11.

Example 10

Coating with Polymer Blend

Preparation of the Polymer Blend Coating (Paint)

A paint with polyaniline and based on polyamide was prepared. Paints which can be used and principles of their manufacture are also described in EP-OS 168 620, WO 89/02155 and WO 93/14166.

To prepare the paint used in this example, 80 wt. % polyaniline and 20 wt. % butyrolactone were firstly mixed in a kneader to produce a pre-dispersion. To 40 wt. % of this pre-dispersion were added 60 wt. % co-polyamide (Eurolon 975 from the company Witco), and the resulting mixture was processed in a kneader at approximately 150° C. to give a homogeneous material. 10 wt. % of this material were then dispersed with 10 wt. % Eurolon 975 and 80 wt. % isopropanol by means of a ball mill for 24 hours. The paint produced was diluted again 1:1 (parts by wt.) with isopropanol and then applied with a doctor in a layer thickness of 50 μm (in the wet state) on steel samples (steel type ST 37). The paint was air-dried and afterwards had a layer thickness of approx. 15 μm. The paint had a polyaniline content of 20 wt. %, relative to the dry weight of the paint material, and a water absorbency of 20 wt. %.

Establishment of the Equilibrium Potential

Figure 12:
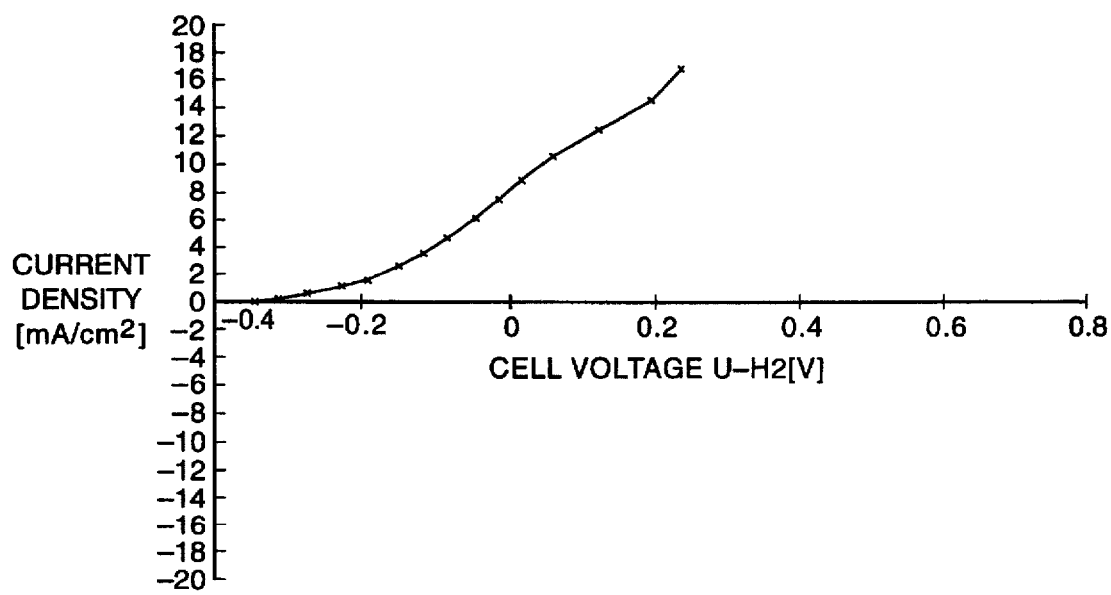

The workpiece coated in this way was then passivated as described in Example 3. The values obtained for the potential and for the corrosion current after establishment of the equilibrium potential are shown graphically in FIG. 12.

Example 11

Coating with Polymer Blend

In accordance with Example 10, a 6 wt. % polyaniline-containing primer based on a commercially obtainable aqueous latex (Senosol one-coat paint from the company Weilburger Lackfabrik, Germany) was prepared in aqueous suspension/dispersion using a ball mill. The obtained primer was applied on steel samples (steel type ST 37) and completely dried. The dried paint showed a water absorbency of 10 wt. %.

Figure 13:
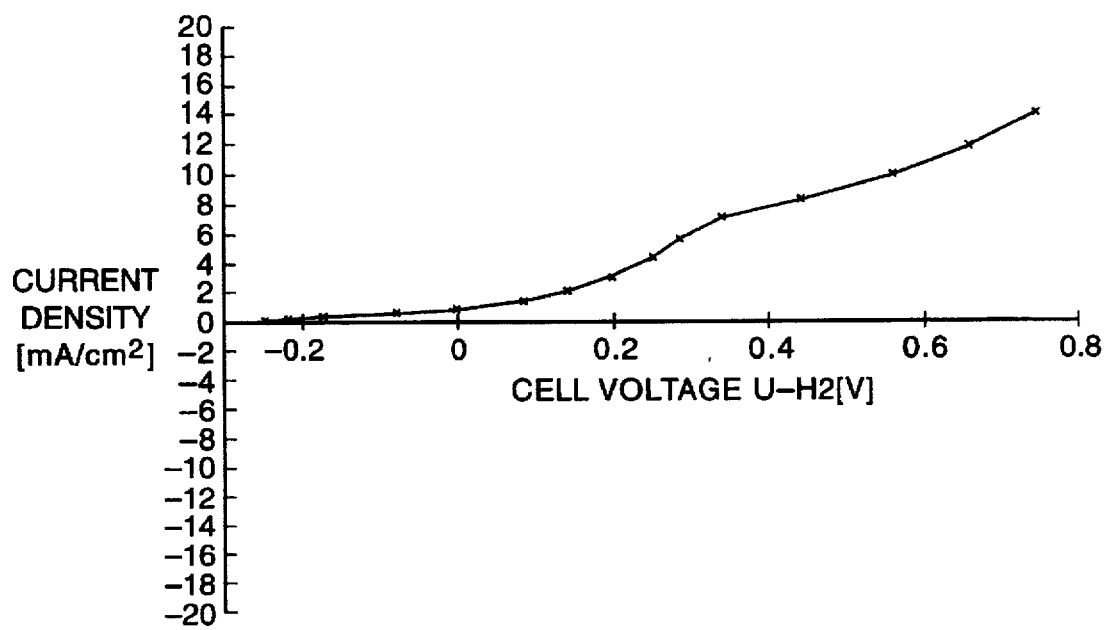

Then the equilibrium potential of the passivation was established as in Example 3. After passivation, the potential and the corrosion current were measured in the same measuring cell. The results of this measurement are shown graphically in FIG. 13.

Example 12

Crevice Corrosion and Pitting of Steel

In this example, the crevice corrosion and pitting of steel samples (ST 37) in FeCl₃ solution according to ASTM G-48 was tested. The following samples were subjected to this test:

Sample (1) (According to the Invention)

This was a steel sample which had been coated according to Example 10 with the paint described there and passivated according to Example 3, and in addition, had an epoxy top coat (Eposyst 2000 from the company Wilckens) as conventional corrosion-protection paint.

Sample (2) (Comparison)

This steel sample had been pre-treated merely by coating with the described epoxy top coat.

Sample 3 (Comparison)

This sample differed from sample (2) only by virtue of additionally having a zinc dust primer coat (epoxide zinc dust paint EPB 7601 from Wilckens). The combination of this primer coat and the epoxy top coat used is known as a very efficient anti-corrosion agent.

The crevice-corrosion test carried out on all samples after damage to the top coat was passed only by the sample according to the invention (1). This sample showed practically no traces of rust at the damaged sites, let alone an infiltration.

Example 13

Contact Corrosion with Copper

In this example, the samples (1) to (3) of the type given in Example 12 were subjected to a contact corrosion test with copper according to DIN 50919. For this, two different arrangements were tested.

In the first arrangement with insulating screw joint against copper and damage inflicted in the form of a cross only through the epoxy layer, the sample (1) passivated with polyaniline showed practically no rust formation at the damaged site. In contrast, the comparison samples (2) and (3) showed a marked deposit of rust.

In the second arrangement, the contact corrosion with short circuit and cross-shaped damage down to the metal surface was tested. The current flow was measured. The steel sample according to the invention (1) showed a current flow of approx. 1 mA. In contrast, with the comparison samples (2) and (3), a noticeably larger current of 2.5 to 3 mA, and therefore a greater rate of corrosion, was measured.

Example 14

Corrosion Test with Outdoor Weathering

Steel samples (1) to (3) of the type given in Example 12, after being damaged by a horizontal cut in the epoxy top coat, were kept for 90 days outdoors in wet and cold spring weather. After the end of the test, the sample according to the invention (1) showed no or only very little rust formation in the cut-damaged corrosion-protection paintwork. In contrast, both the sample (2) provided with the epoxy coating and the sample (3) additionally provided with zinc dust primer coat showed severe rust formation.

Example 15

Corrosion Test with Outdoor Weathering

In another corrosion test with outdoor weathering, steel sheet samples (steel type Bonder from the company Chemetal, Frankfurt) were used, which had in each case been half-coated according to Example 10 with the paint described there and passivated according to Example 3, and finally provided with a top coating (vinyl chloride-vinyl acetate copolymer paint from the company Hagebau, called "Hagebau Flüssigkunststoff"). Since the top coating was transparent, changes at the metal surface and in the paint were observed easily. Cuts were made in the top coating in the horizontal direction which extended from the non-passivated half into the passivated half.

The test was carried out with three different samples. Sample (A) was not treated additionally, whilst sample (B) had been phosphate-coated before the polyaniline layer was deposited, and whilst in case of sample (C), the polyaniline primer layer had been carefully removed following the passivation.

The result of keeping these samples for 90 days in cold and wet spring weather was that, in all samples, the cut-shaped damage to the top coat in the non-passivated region had been markedly infiltrated for a few millimeters by corrosion, whilst in the passivated halves, such infiltration was practically undetectable. In the passivated half, sample (B) had no rust at all and sample (A) showed only very little rust. Sample (C) had rusted in the cut-shaped damage in the passivated half, but was not infiltrated.

This test therefore showed that the polyaniline primer should remain on the surface of the metal substrate to be protected (samples (A) and (B)), since an infiltration and rust formation in the damaged area was thereby ruled out under the test conditions.

Example 16

Corrosion Protection with Already Rusted Steel Samples

Figure 14:
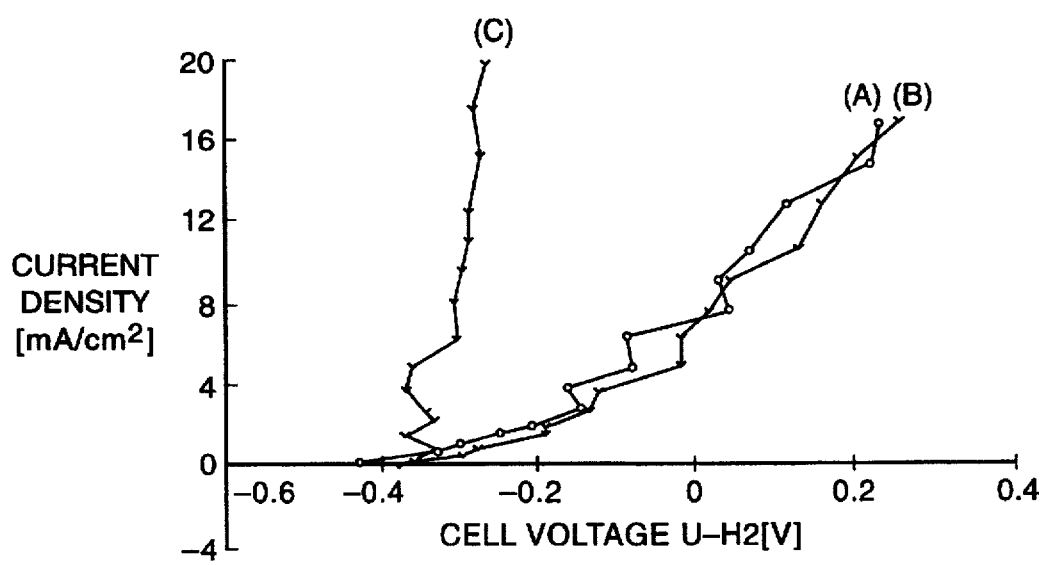

In this example, steel samples (ST 37) were kept in the open for three weeks in wet and cool spring weather. During this period, a thick brown layer of rust had formed on all samples. The rusted samples were dried for two days at approx. 20° C. in the laboratory and then gently freed of loosely adherent rust using a soft brush. Afterwards, the samples were coated according to Example 2 with pure polyaniline. The coating had been produced by immersion 10 times into (A), a dispersion of polyaniline in DMSO (dimethyl sulphoxide) and (B), a dispersion of polyaniline in NMP (N-methyl pyrrolidone). After coating, samples (A) and (B) were passivated for 24 hours according to Example 3. The current/potential curves obtained for both samples and, for comparison, that of an untreated, already rusted steel sample (C) are reproduced in FIG. 14.

The curves clearly show that even after a deposit of rust has already formed, a very good corrosion protection can be obtained using the process according to the invention.

Example 17

Corrosion Protection with V2A Steel

Figure 15:
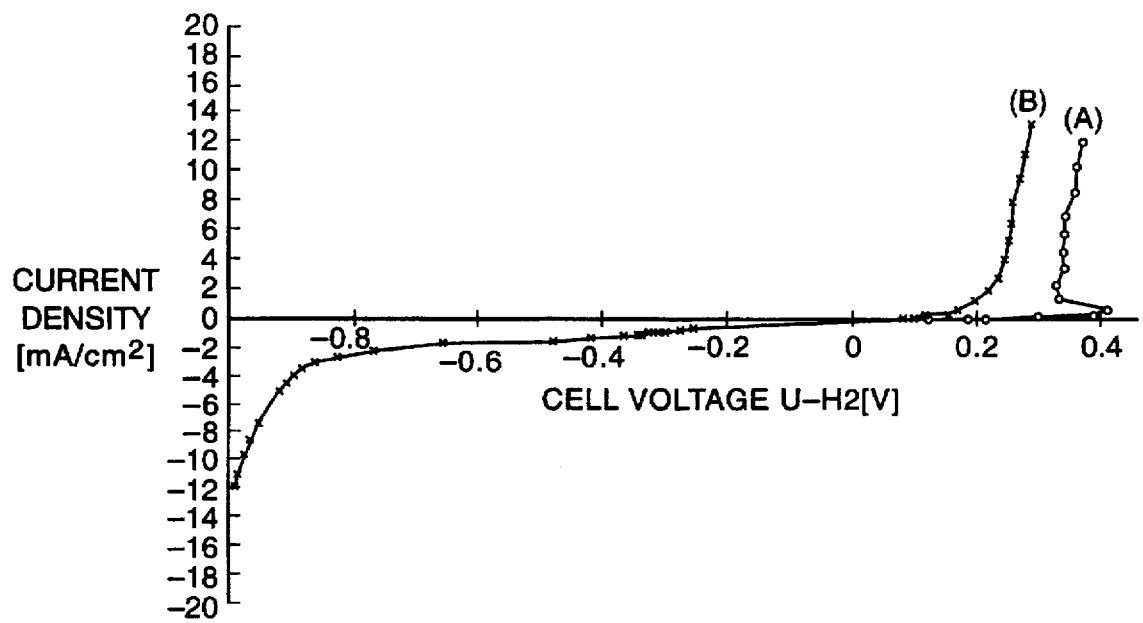

Samples of V2A steel were coated according to Example 2 with pure polyaniline and passivated according to Example 3. The current density/potential curves for the thus obtained workpieces according to the invention (A), and for those which remained untreated for comparison purposes, called workpieces (B), are reproduced in FIG. 15.

The curves show that even in the case of a high-grade steel, such as V2A steel, the process according to the invention leads to a noticeable shift of the current density/potential curve to more noble potentials.

Example 18

Corrosion-Protection Effect in Acid Medium

Figure 16:
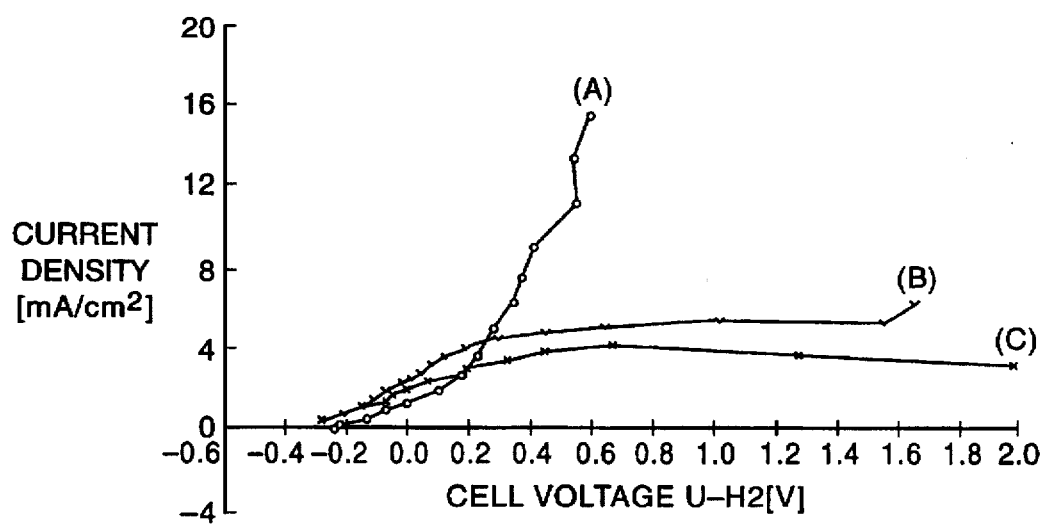

In order to test the corrosion-protection effect in acidic media, which is particularly important for practical applications, three steel workpieces (A), (B) and (C) were coated according to Example 10 with the paint described there. All the workpieces were then passivated according to Example 3. For (A) and (B) 1 molar aqueous NaCl solution was used as passivating medium, and for (C) 1 molar aqueous p-toluene sulphonic acid solution. The corresponding current density/potential curves were then recorded for workpiece (A) in 1 molar aqueous NaCl solution and for workpieces (B) and (C) in 1 molar aqueous p-toluene sulphonic acid solution. The obtained curves are reproduced in FIG. 16.

They prove that the workpieces prepared using the process according to the invention are even better protected against corrosion attack if the process is carried out in acidic media instead of neutral media.

I claim:

1. A corrosion-protected metallic material comprising the combination of:

(1) a metal substrate having (2) a non-electrochemically-deposited dispersion coating thereon, which coating includes an intrinsically-conductive polymer (a) having the capability of absorbing water, and (b) exhibiting a redox potential with respect to a hydrogen electrode of from −300 to +1800 mV, and which coating, after application to said substrate, has been exposed to subsequent contact with a passivating medium comprising oxygen-containing water for a period of at least 30 seconds.

2. A corrosion-protected metallic material according to claim 1, wherein during said contact with said passivating medium, an equilibrium potential is reached with said metallic material.

3. A corrosion-protected metallic material according to claim 1, wherein after said contact with said passivating medium, said non-electrochemically deposited dispersion coating is subsequently removed.

4. A corrosion-protected metallic material according to claim 1 wherein after said contact with said passivating medium, said coated metallic material is subsequently repassivated by applying to said coated metallic material a potential, measured with respect to a hydrogen electrode, of between about 50 to about 500 mV more negative than an equilibrium potential of said metallic material coated with said intrinsically conductive polymer, for a period of at least about 1.5 minutes, and at a current of from 0 to less than about 2 mA/cm$^2$.

5. A corrosion-protected metallic material according to claim 1, wherein said metal substrate comprises iron or a steel.

6. A corrosion-protected metallic material according to claim 1, wherein said metal substrate is a corroded substrate.

7. A corrosion-protected metallic material according to claim 1, wherein said metal substrate comprises copper or aluminum.

8. A corrosion-protected metallic material according to claim 1, said material further comprising an additional corrosion protection covering.

9. A corrosion protected metallic material according to claim 1, wherein said conductive polymer is polyanaline.

10. A corrosion protected metallic material according to claim 1, wherein said conductive polymer has a water absorbency of at least 0.5 wt. % relative to the dry weight of said layer.

11. A corrosion-protected metallic material according to claim 1 wherein said water absorbency is at least 1 wt. %.

12. A corrosion protected metallic material according to claim 1, wherein said passivating medium is oxygen-containing water.

13. A corrosion protected metallic material according to claim 1, wherein said oxygen-containing water has a conductivity of at least 20 µS.

14. A corrosion protected metallic material according to claim 1, wherein said intrinsically-conductive polymer is a polymer blend containing at least one conductive polymer.

15. A corrosion protected metallic material according to claim 14, wherein said polymer blend contains 0.1 to 45 wt. % intrinsically conductive polymer.

16. A corrosion protected metallic material according to claim 1, wherein said metallic material of step (a) is a phosphate coated metallic material.

17. A corrosion protected metallic material according to claim 1, wherein said passivation medium also includes at least one additional oxidizing agent.

18. A corrosion-protected metallic material according to claim 17, wherein said additional oxidizing agent is selected from the class consisting of Fe(III) ions, ammonium peroxidisulfate, potassium permanganate and hydrogen peroxide.

19. A corrosion protected metallic material according to claim 1, wherein said material has been repassivated by applying a potential measured with respect to a hydrogen electrode of between 50 to 500 mV more negative than the equilibrium potential of said metallic material coated with said intrinsically conductive polymer, for a period of at least 1.5 minutes and at a current of from 0 to less than 2 mA/cm$^2$.

20. A corrosion-protected metallic material according to claim 19 which comprises an additional corrosion protection covering.

* * * * *